(12) United States Patent
Rahm

(10) Patent No.: US 7,134,509 B2
(45) Date of Patent: Nov. 14, 2006

(54) PORTABLE POWER TOOL WITH ROTATING OUTPUT SHAFT AND OVERLOAD PROTECTION

(75) Inventor: Erik Roland Rahm, Upplands Väsby (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 10/492,462

(22) PCT Filed: Oct. 15, 2002

(86) PCT No.: PCT/SE02/01865

§ 371 (c)(1),
(2), (4) Date: Apr. 13, 2004

(87) PCT Pub. No.: WO03/033203

PCT Pub. Date: Apr. 24, 2003

(65) Prior Publication Data

US 2004/0206524 A1    Oct. 21, 2004

(30) Foreign Application Priority Data

Oct. 16, 2001 (SE) .................................... 0103426

(51) Int. Cl.
 E21B 3/035 (2006.01)
 B23B 45/00 (2006.01)
 B25B 17/00 (2006.01)
(52) U.S. Cl. .................... 173/216; 173/170; 81/57.13; 192/56.1
(58) Field of Classification Search ............... 173/213, 173/216, 164, 167, 217, 170; 81/57.13, 57.29, 81/57.28; 408/139, 9, 124, 6; 192/17 R, 192/12 R, 56.1; 464/35; 409/231
See application file for complete search history.

(56) References Cited

U.S. PATENT DOCUMENTS

| 2,881,103 | A | * | 4/1959 | Ewels et al. ................. 438/537 |
| 3,872,951 | A | * | 3/1975 | Hastings, Jr. ................ 188/69 |
| 3,942,337 | A | * | 3/1976 | Leonard et al. ............... 464/36 |
| 4,400,995 | A | * | 8/1983 | Palm ........................... 74/527 |
| 4,610,340 | A |   | 9/1986 | Helmes et al. |
| 4,834,192 | A | * | 5/1989 | Hansson ..................... 173/178 |
| 4,951,756 | A | * | 8/1990 | Everett et al. .............. 173/178 |
| 5,346,023 | A |   | 9/1994 | Takagi et al. |
| 5,577,425 | A | * | 11/1996 | Holmin et al. ............. 81/57.39 |
| 5,672,110 | A | * | 9/1997 | Kurita et al. ................ 464/37 |
| 5,857,913 | A |   | 1/1999 | Fujimura et al. |
| 6,047,616 | A | * | 4/2000 | Ochiai ....................... 81/57.29 |
| 6,702,090 | B1 | * | 3/2004 | Nakamura et al. ....... 192/223.2 |

FOREIGN PATENT DOCUMENTS

DE    3335729 A1    4/1985

(Continued)

Primary Examiner—Stephen F. Gerrity
Assistant Examiner—Paul Durand
(74) Attorney, Agent, or Firm—Frishauf, Holtz, Goodman & Chick, P.C.

(57) ABSTRACT

A portable power tool is provided which includes a rotation motor (11), an output shaft (14), a gearing (13) and a drive spindle (12; 112) connecting the gearing (13) to the motor (11). A drive line arresting lock device (17; 117) is provided to facilitate loosening and/or tightening of a working implement mounting device (15), and a releasable safety clutch (23; 123) is provided between the lock device (17; 117) and the gearing (13) for protecting the gearing (13) against transmission of detrimental excessive torque magnitudes manually applied on the output shaft/mounting device (14, 15).

6 Claims, 1 Drawing Sheet

FOREIGN PATENT DOCUMENTS

| | | |
|---|---|---|
| EP | 0559918 A1 | 9/1993 |
| EP | 0608083 A1 | 7/1994 |
| SU | 853226 B | 8/1981 |

* cited by examiner

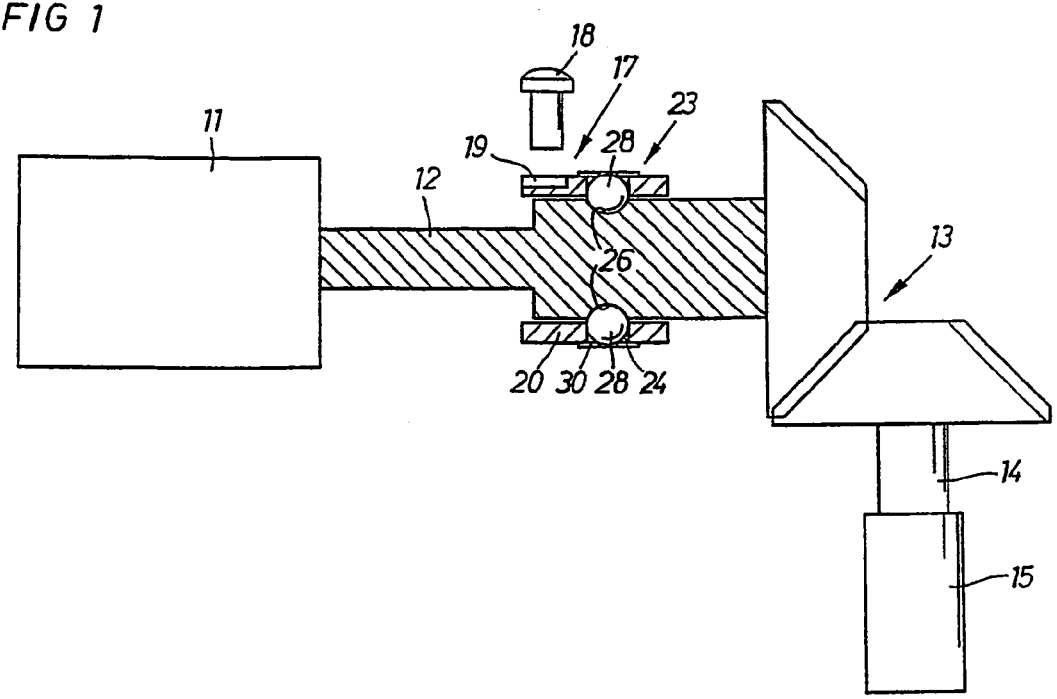
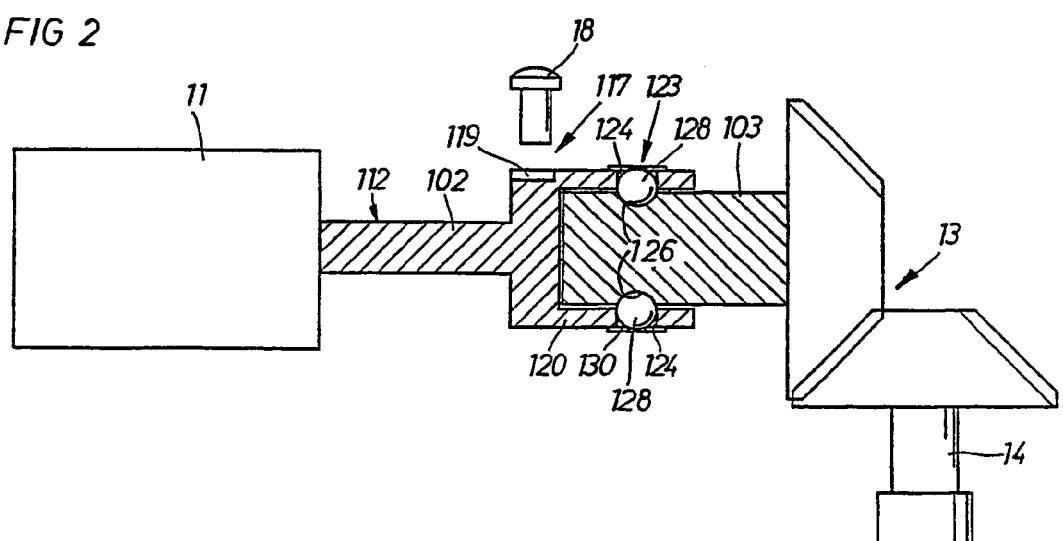
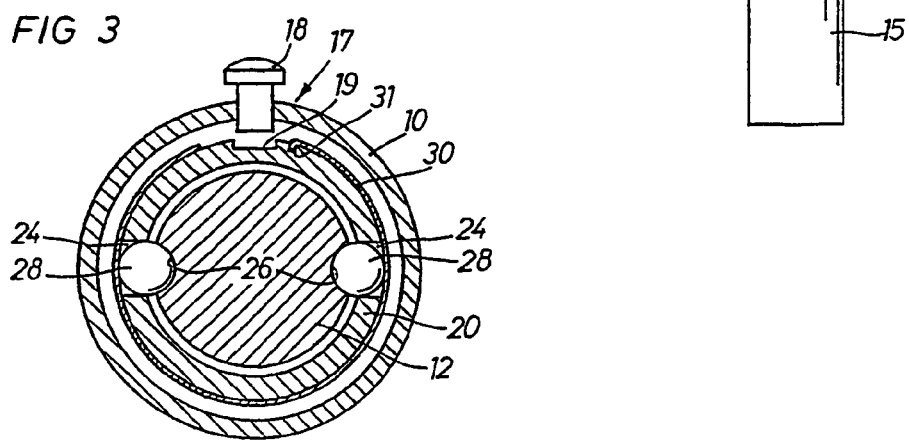

PORTABLE POWER TOOL WITH ROTATING OUTPUT SHAFT AND OVERLOAD PROTECTION

This application is a U.S. National Phase Application under 35 USC 371 of International Application PCT/SE02/01865filed Oct. 15, 2002.

The invention relates to a portable power tool of the type having a rotating output shaft with a mounting device for attachment of a working implement.

In power tools of this type there are incorporated manually operable lock means for arresting the output shaft against rotation for facilitating loosening and tightening the mounting device for the working implement. Usually a spanner or other type of tool has to be used for operating the mounting device, and very often a rather high torque has to be applied on the mounting device to accomplish the intended operation.

In most power tools, the motor is connected to the output shaft via a gearing, and in angle drive tools in particular, the output shaft arresting lock device, for practical reasons, has to be located somewhere between the motor and the angle gearing. This means that the high torque levels occasionally applied on the mounting device /output shaft has to be transferred to the lock device via the angle gearing. This causes an excessive strain on the angle gearing parts, a strain that is beyond what any calculated normal tool operation load would cause. Accordingly, loosening and/or tightening of the mounting device may expose the angle gearing to a damage risk.

Another overload situation for an angle gearing occurs from time to time at angle drill tools when the drill attached to the mounting device/output shaft gets jammed at break through of the work piece and the rotation motor is caused to stall. In such a situation, the operator has to apply a turning torque on the tool housing to make the drill fully penetrate the work piece. This extra torque may often result in an overload of the angle gearing and, hence, a damage risk for the angle gearing parts.

The main object of the invention is to provide a portable power tool having a rotating output shaft which is connected to a rotation motor via a gearing, and in which a drive line arresting lock device is located between the motor and the gearing to facilitate loosening and/or tightening of a working implement mounting device on the output shaft, wherein the gearing is protected by a releasable safety clutch from being damaged by excessive torque load occasionally applied on the output shaft at operation of the working implement mounting device.

A further object of the invention is to provide a portable power tool including an output shaft which is connected to the rotation motor via an angle gearing and a drive spindle, and in which a drive line arresting lock device is located between the angle gearing and the motor, and in which a releasable safety clutch is provided between the angle gearing and the lock device and arranged to release and disconnect the angle gearing from both the lock device and the rotation motor at excessive torque load applied on the output shaft.

Further objects and advantages of the invention will appear from the following specification and claims.

Preferred embodiments of the invention are described below with reference to the accompanying drawings.

In the drawings:

FIG. 1 shows a schematic view of a power tool according to one embodiment of the invention.

FIG. 2 shows a schematic view of a power tool according to another embodiment of the invention.

FIG. 3 shows a cross section of either one of the power tools shown in FIGS. 1 and 2.

The tool illustrated in FIG. 1 is a portable power tool intended for any application where a rotating working implement is to be used, for instance drilling and grinding. The tool comprises a housing 10, a rotation motor 11, a drive spindle 12, an angle gearing 13, and an output shaft 14 carrying a mounting device like a chuck 15 for attachment of a working implement.

In order to facilitate loosening and/or tightening of the chuck 15 there is used a spanner, and to prevent the output shaft from rotating when applying a torque with the spanner there is provided a drive line arresting lock device 17. This lock device 17 is located to the drive spindle 12 between the angle gearing 13 and the rotation motor 11, because in an angle type tool there is very little room for locating the lock device 17 to the output shaft 14.

The drive line arresting lock device 17 comprises a selectively shiftable latch element 18 movably supported on the tool housing, and an abutment means in the form of an aperture 19 on a tubular sleeve element 20 coupled to the drive spindle 12.

Due to the fact that the lock device 17 is located to a point where the angle gearing 13 would have to transfer the entire tightening and/or loosening torque applied on the mounting device 15 to the tool housing, there is provided an overload protecting means to avoid damage to the angle gearing 13 at occasionally applied excessive torque loads on the output shaft 14. This overload protecting means comprises a releasable safety clutch 23 coupling the sleeve element 20 to the drive spindle 12.

As illustrated in FIG. 3, the safety clutch 23 comprises two lateral through openings 24 located diametrically opposite each other, two apertures 26 located on the drive spindle 12 opposite the openings 24, and two balls 28 which are movably supported in the openings 24 and which have a diameter exceeding the thickness of the sleeve element 20. A circular leaf spring 30 encircles the sleeve element 20 and applies a bias force on the balls 28 to make the latters enter and engage the apertures 26 in the drive spindle 12. The spring 30 is locked to the sleeve element 20 by its one end being bent over and inserted into a slot 31 in the sleeve element 20.

When a working implement is to be attached or removed from the output shaft 14 a spanner or similar tool is applied on the chuck 15, and in order to prevent rotation of the drive line including the output shaft 14 the latch element 18 is pressed into engagement with the aperture 19 on the sleeve element 20. If an excessive torque is needed to loosen or tighten the chuck 15 the balls 28 will be forced out of their engagement with the apertures 26 against the bias action of the spring 30 and there will occur a relative rotation between the drive spindle 12 and the sleeve element 20. This means that the safety clutch 23 prevents a too high a torque magnitude be transferred to the housing via the angle gearing 13. Thereby, the angle gearing 13 is protected from detrimental overload.

In normal cases, though, the torque required to loosen and/or tighten the chuck 15 does not exceed the torque magnitude safely transferable by the angle gearing 13 and for which the angle gearing 13 is designed and dimensioned. This means that in the majority of cases the safety clutch 23 remains engaged and provides a high enough arresting torque on the drive spindle 12 to enable the chuck 15 to be properly operated by a spanner.

In the embodiment illustrated in FIG. 2, there is included a safety clutch 123 which has a somewhat extended function in relation to the above described clutch 23, namely to protect the angle gearing 13 from detrimental overload also when the rotation motor 11 is locked up by stalling and does not rotate along when the output shaft 14 is rotated by external force. This occurs from time to time when in a drilling application the drill has become jammed at the end of the drilling operation just before breaking through the work piece and the motor stalls due to overload. In this situation the operator applies a manual force on the tool housing to make the drill penetrate the work piece completely. Since the motor has stalled it will not rotate along when forcing the output shaft 14 to rotate, which means that the applied manual force could generate an excessive torque load on the angle gearing which may reach beyond the maximum allowable load for the angle gearing 13, even though the lock device 17 is not activated.

In order to protect the angle gearing 13 from excessive torque loads applied on the output shaft 14 even when the motor 11 has stalled, the drive spindle 112 is divided into a first part 102 which is connected to the motor 11 and a second part 103 which is connected to the angle gearing 13. The first part 102 of the drive spindle 112 is formed with a tubular sleeve element 120 which is provided with an external aperture 119 to be engaged by the latch element 18 to thereby form a drive line arresting lock device 117. The safety clutch 123 is located between the sleeve element 120 on the first drive spindle part 102 and the second drive spindle part 103 and comprises two opposite through openings 124 in the sleeve element 120 and two balls 128 movably supported in these openings 124. The second part 103 of the drive spindle 112 extends into the sleeve element 120 and is formed with two apertures 126 located opposite the openings 124. A circular leaf spring 130 is mounted on the outside of the sleeve element 120 and arranged to bias the balls 128 into engagement with the apertures 126.

As in the above described embodiment, the balls 128 will be forced out of engagement with the two apertures 126 as the external torque load on the output shaft 14 becomes too high and permit rotation between the sleeve element 120 and the second drive spindle part 103. However, by this alternative design the drive spindle parts 102, 103 are able rotate relative to each other, which means that an excessive torque manually applied on the output shaft 14 can not be transferred to the tool housing 10 via the stalled "locked up" rotation motor 11 instead of via the lock device 117. This means that the angle gearing 13 is protected from detrimental torque overload also in cases of a stalled motor.

The invention is suitable for use at pneumatically powered tools but may as well find its use at electric tools. Neither is the invention limited to the above described embodiments but includes all examples being defined by the claims. For instance, the safety clutch may be designed in a number of ways including a different number of ball elements, other types of ball biassing springs etc.

The invention claimed is:

1. A portable power tool comprising:
   a housing,
   a rotation motor,
   an output shaft with a mounting device for attachment of a working implement thereto,
   a power transmission including a drive spindle connected to the motor,
   a gearing connecting the drive spindle to the output shaft,
   a selectively activatable lock device including a latch element which is movably supported in the housing and which is engagable with at least one abutment member co-rotative with the drive spindle to arrest rotation of the drive spindle relative to the housing, and
   a torque responsive safety clutch which is located between the gearing and the abutment member, and which releases to protect the gearing from being exposed to excessive torque levels occasionally applied on the output shaft.

2. The power tool according to claim 1, wherein:
   the gearing comprises an angle gear, and
   the lock device and the safety clutch are located between the abutment member and the angle gear.

3. The power tool according to claim 1, wherein:
   the safety clutch comprises a tubular sleeve element surrounding the drive spindle,
   the sleeve element is provided with the abutment member and includes at least one lateral through opening extending therethrough,
   the drive spindle includes at least one aperture located opposite the at least one lateral through opening in the sleeve element,
   at least one ball is movably supported in the at least one lateral through opening and has a diameter exceeding a thickness of a wall of the sleeve element in a radial direction thereof, and
   at least one spring element is arranged to bias the at least one ball radially into the at least one aperture.

4. The power tool according to claim 3, wherein the at least one spring element comprises a single circular leaf spring which is mounted on an outside portion of the sleeve element and which is arranged to exert a radial bias force on the at least one ball.

5. The power tool according to claim 1, wherein:
   the safety clutch comprises a tubular sleeve element which is part of a first part of the drive spindle and which is powered by the motor,
   the sleeve element is provided with the abutment member and has at least one lateral through opening extending therethrough,
   a second part of the drive spindle is connected to the gearing and extends into the sleeve element,
   the second part of the drive spindle has at least one aperture located opposite the at least one lateral through opening of the sleeve element,
   at least one ball is movably supported in the at least one lateral through opening and has a diameter exceeding a thickness of a wall of the sleeve element in a radial direction thereof, and
   at least one spring element is arranged to bias the at least one ball radially into the at least one aperture.

6. The power tool according to claim 5, wherein the at least one spring element comprises a single circular leaf spring which is mounted on an outside portion of the sleeve element and which is arranged to exert a radial bias force on the at least one ball.

* * * * *